United States Patent
Eckert et al.

(10) Patent No.: US 9,110,671 B2
(45) Date of Patent: *Aug. 18, 2015

(54) IDLE PHASE EXIT PREDICTION

(71) Applicant: Advanced Micro Devices, Inc., Sunnyvale, CA (US)

(72) Inventors: Yasuko Eckert, Kirkland, WA (US); Srilatha Manne, Portland, OR (US); William L Bircher, Austin, TX (US); Mahdu S. S. Govindan, Austin, TX (US); Michael J Schulte, Austin, TX (US); Manish Arora, Dublin, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/724,599

(22) Filed: Dec. 21, 2012

(65) Prior Publication Data

US 2014/0181556 A1    Jun. 26, 2014

(51) Int. Cl.
*G06F 1/32* (2006.01)
(52) U.S. Cl.
CPC ............. *G06F 1/3296* (2013.01); *G06F 1/324* (2013.01); *Y02B 60/1217* (2013.01); *Y02B 60/1285* (2013.01)
(58) Field of Classification Search
CPC ... G06F 1/3296; G06F 1/324; Y02B 60/1217; Y02B 60/1285
See application file for complete search history.

(56) References Cited

U.S. PATENT DOCUMENTS

| | | | |
|---|---|---|---|
| 2009/0172441 A1* | 7/2009 | Kant et al. | 713/323 |
| 2009/0235105 A1 | 9/2009 | Branover et al. | |
| 2010/0058078 A1 | 3/2010 | Branover et al. | |
| 2010/0287394 A1 | 11/2010 | Branover et al. | |
| 2011/0078478 A1 | 3/2011 | Branover et al. | |
| 2011/0113202 A1* | 5/2011 | Branover et al. | 711/135 |
| 2011/0161627 A1* | 6/2011 | Song et al. | 712/30 |
| 2014/0149772 A1* | 5/2014 | Arora et al. | 713/323 |

OTHER PUBLICATIONS

U.S. Appl. No. 13/174,144, entitled "Managing Processor-State Transitions", filed Jun. 30, 2011.
2nd Generation Intel Core Processor Family Desktop: Datasheet, vol. 1, Supporting Intel Core i7, i5 and i3 Desktop Processor Series, Intel, Sep. 2012, 112 pages.

(Continued)

*Primary Examiner* — M Elamin
(74) *Attorney, Agent, or Firm* — Meyertons Hood Kivlin Kowert & Goetzel; Erik A. Heter

(57) ABSTRACT

A method and apparatus for exiting a low power state based on a prior prediction is disclosed. An integrated circuit (IC) includes a functional unit configured to, during operation, cycle between intervals of an active state and intervals of an idle state. The IC also include a power management unit configured to place the functional unit in a low power state responsive to the functional unit entering the idle state. The power management unit is further configured to preemptively cause the functional unit to exit the low power state at a predetermined time after entering the low power. The predetermined time is based on a prediction of idle state duration made prior to entering the low power state. The prediction may be generated by a prediction unit, based on a history of durations of intervals in which the functional unit was in the idle state.

23 Claims, 9 Drawing Sheets

(56) References Cited

OTHER PUBLICATIONS

U.S. Appl. No. 13/308,547, entitled "Idle Power Control in Multi-Display Systems", filed Dec. 1, 2011.
"Bios and Kernel Developer's Guide (BKDG) for AMD Family 15h Models 10h-1Fh Processors", Advanced Micro Devices, Inc., Rev. 3.00, May 23, 2012, 643 pages.
"Advanced Configuration and Power Interface Specification", Compaq Computer Corporation, Intel Corporation, Microsoft Corporation, Phoenix Technologies Ltd., Toshiba Corporation, Revision 2.0c, Aug. 25, 2003, 518 pages.
Hu, Zhigang et al., "Microarchitectural Techniques for Power Gating of Execution Units", Proceedings of the 2004 International Symposium on Low Power Electronics and Design, ISLPED, Aug. 2004, Newport Beach, CA, pp. 32-37.

* cited by examiner

IDLE PHASE EXIT PREDICTION

BACKGROUND

1. Technical Field

This disclosure relates to integrated circuits, and more particularly, to exiting low power states of integrated circuits.

2. Description of the Related Art

Managing power consumption in integrated circuits (ICs) such as computer system processors and various types of system-on-a-chip (SoC) ICs is increasingly important. This is true not only during times when an IC is actively performing work, but also during times when the IC is idle. In particular, the small feature sizes of transistors in ICs can result in leakage currents and thus power consumption even in functional units that are otherwise not performing any work.

When a functional unit of an IC becomes idle, power management hardware or software may take various actions to reduce power consumption. Reducing clock frequencies or gating clocks may reduce dynamic power consumption. Reducing a supply voltage may provide additional reductions in power consumption. In some cases, a functional unit may be power gated (i.e. may have power removed therefrom) when it is idle. This may be referred to as a deep sleep state.

Entry into a low power or sleep state may be accomplished by performing various actions. Consider for example an SoC having multiple processor cores and a power management unit implemented thereon. Actions performed in placing a processor core into a sleep state may include flushing any caches that will lose power, turning off power from phase locked loops (PLLs), saving system states, and so forth. Upon entry into the low power or sleep state, the processor core may remain there until an external interrupt or other action that causes initiation of a wakeup of the core.

SUMMARY OF EMBODIMENTS OF THE DISCLOSURE

A method and apparatus for idle state exit prediction is disclosed. In one embodiment, a method includes a functional unit of an integrated circuit (IC) entering an idle state. The method further includes placing the functional unit in a low power state responsive to the functional unit entering the idle state. The low power state may be preemptively exited at a predetermined time after entry thereto. The predetermined time is based on a prediction of idle state duration made prior to entering the low power state.

In one embodiment, an IC includes a functional unit configured to cycle between intervals of an active state and intervals of an idle state. The IC further includes a power management unit configured to place the functional unit in a low power state responsive to the functional unit entering the idle state. The power management unit is further configured to preemptively cause the functional unit to exit the low power state at a predetermined time after entering the low power state, wherein the predetermined time is based on a prediction of idle state duration made prior to entering the low power state.

BRIEF DESCRIPTION OF THE DRAWINGS

Other aspects of the disclosure will become apparent upon reading the following detailed description and upon reference to the accompanying drawings, which are now briefly described.

Figure 1:
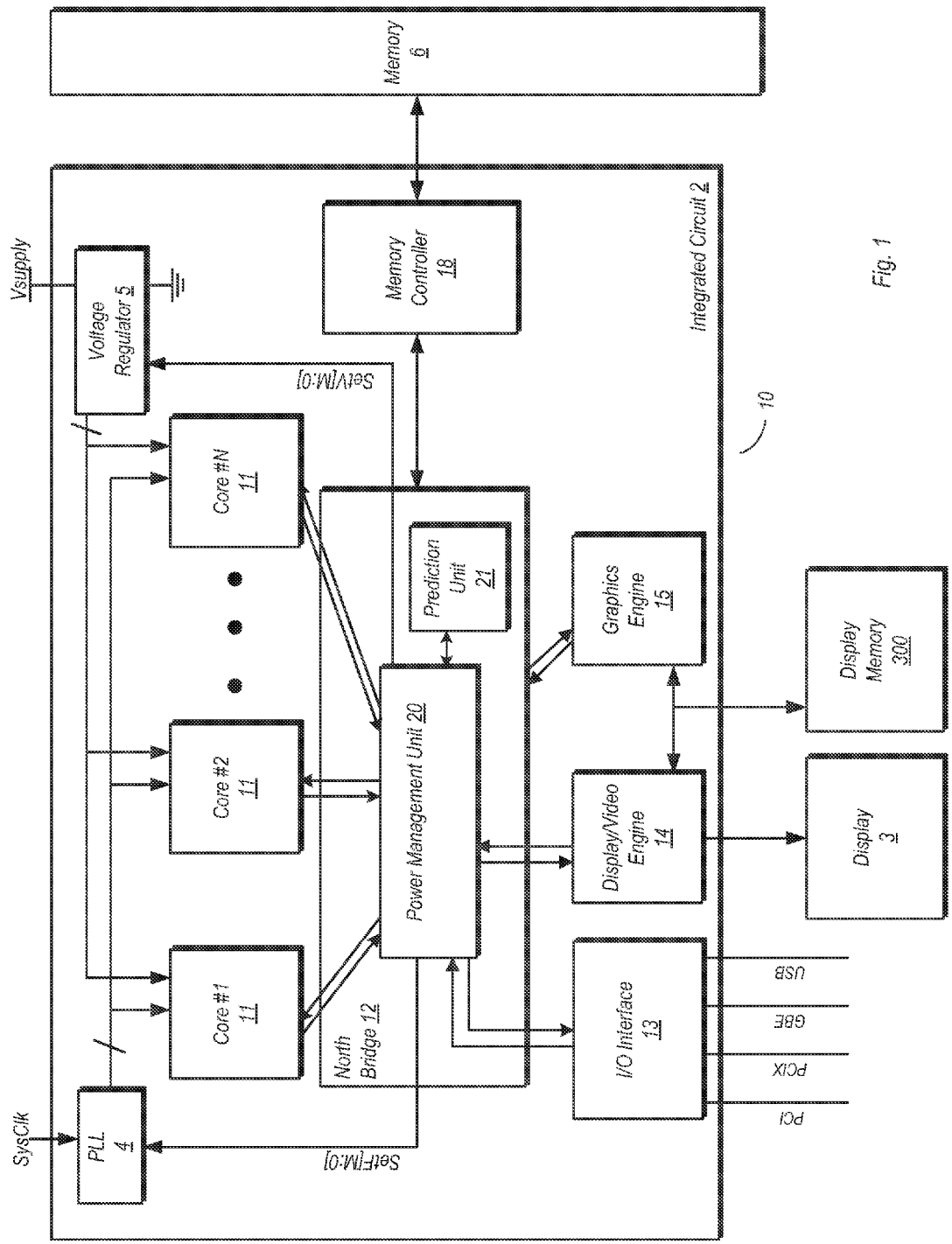
FIG. 1 is a block diagram of one embodiment of an integrated circuit (IC).

While the subject matter disclosed herein is susceptible to various modifications and alternative forms, specific embodiments thereof are shown by way of example in the drawings and will herein be described in detail. It should be understood, however, that the drawings and description thereto are not intended to be limiting to the particular form disclosed, but, on the contrary, is to cover all modifications, equivalents, and alternatives falling within the spirit and scope of the present disclosure as defined by the appended claims.

DETAILED DESCRIPTION

Overview:

The present disclosure is directed to various method and apparatus embodiments for preemptively exiting a low power state based on a prediction of an idle state duration made prior to entering the low power state. The term 'preemptively' as used herein may be defined as an exit of the low power state in the absence of another event (e.g., an interrupt from an external agent) that would otherwise cause an exit of the low power state responsive thereto.

An IC according to the present disclosure may include one or more functional units and a power management unit. In order to save power, the power management unit may cause the various functional units to enter a low power state when they are in an idle state (e.g., not performing useful work). The IC may also include a prediction unit configured to predict both the duration of the next idle state and the time at which the functional unit should be removed from the low power state. After exiting the low power state, the functional unit may be readied to perform useful work. The power management unit may be implemented in various locations on the IC die, including (but not limited to) within a north bridge unit.

In one embodiment, a system-on-a-chip (SoC) includes a plurality of processor cores, a power management unit, and a prediction unit. Operation of the processor cores may cycle through intervals of active states and idle states. The power management unit may, in some cases, place idle processor cores into a low power or sleep state (in which power and clock are turned off), depending on a prediction of the duration of the idle state. The prediction unit may also generate a designated time for the processor core to be awakened from the low power/sleep state after entry thereto. If no other external wakeup condition is generated, the power management unit may cause the processor core to exit the low power state at the designated wakeup time. After exiting the low power/sleep state, the processor core may be prepared to perform useful work.

System-on-a-Chip (SoC) with Power Management Unit and Operation Thereof:

FIG. 1 is a block diagram of one embodiment of an integrated circuit (IC) coupled to a memory. IC 2 and memory 6, along with display 3 and display memory 300, form at least a portion of computer system 10 in this example. In the embodiment shown, IC 2 is a system-on-a-chip (SoC) having a number of processing nodes 11. Processing nodes 11 are processor cores in this particular example, and are thus also designated as Core #1, Core #2, and so forth. It is noted that the methodology to be described herein may be applied to other arrangements, such as multi-processor computer systems implementing multiple processors (which may be single-core or multi-core processors) on separate, unique IC dies. Furthermore, embodiments having only a single processing node 11 are also possible and contemplated.

Each processing node 11 is coupled to north bridge 12 in the embodiment shown. North bridge 12 may provide a wide variety of interface functions for each of processing nodes 11, including interfaces to memory and to various peripherals. In addition, north bridge 12 includes a power management unit 20 that is configured to manage the power consumption of each of processing nodes 11. The power management functions performed by power management unit 20 is the determination of whether to enter various low power states based on the activity level of processing nodes 11. For example, if a processing node 11 is idle, power management unit 20 may reduce the voltage supplied thereto and or reduce the frequency of a clock signal provided thereto. Moreover, if a given processing node 11 is idle for a sufficient amount of time, power management unit 20 may place it into a sleep state by gating (i.e. turning off) both the clock signal and the power provided thereto. Power management unit 20 may provide various signals to a processing node 11 prior to gating power and clock signals provided thereto in order to enable it to perform actions such as flushing caches, saving states, and so forth.

In the embodiment shown, north bridge 12 includes a prediction unit 21 coupled to power management unit 20. Prediction unit 21 is configured to store and analyze information related to the history of previous idle states for each of the processor cores 11, and may also store information related to the history of previous active states. In particular, prediction unit 21 may store information regarding respective durations of a number of previously occurring idle states for each processor core 11. Prediction unit 21 and may store information regarding respective durations of a number of previously occurring active states for each processor core 11. The duration information for each processor core may be arranged in bins, as is discussed further below. Using the information duration for the idle states, prediction unit 21 may predict the duration of the next idle state for each of the processor cores 11.

Using the predictions made by prediction unit 21, power management unit 20 may determine whether to place a processor core 11 into a low power state responsive to determining that it is idle. A low power state as defined herein may be a state in which a voltage supplied to processor core is reduced from its maximum, a state in which the frequency of the clock signal is reduced, a state in which the clock signal is inhibited from a processor core (clock-gated), one in which power is removed from a processor core (power gated), or a combination of any of the former. A low power state in which both clock and power are removed from a processor core may be referred to as a sleep state.

Since there is overhead in entering a low power state in terms of energy costs and performance costs, power management unit 20 may use the prediction to determine if entry into a low power state may provide power savings at or beyond a break-even point. For example, entry into a sleep state may require flushing of one or more caches, saving a processor state, powering down PLLs, and so on. Upon exit from a sleep state, PLLs may require a warm-up period before fully operating. Restoration of a previous state may also be required upon exit from a sleep state. Cache misses may also occur frequently upon re-commencing operations following the exit from a sleep state. Accordingly, entry into a sleep state (and more generally, entry into a low power state) incurs various costs. If prediction unit 21 predicts that a next idle state may be of a short duration, power management unit 20 may forgo entry into a low power state, as the costs incurred in doing so may outweigh the benefit of the power savings that may be obtained. Conversely, if prediction unit 21 predicts that the next idle state may be of a long duration, the power savings obtained by entry into a low power/sleep state may outweigh costs of entry into that state. Thus, in the latter case, power management unit 20 may place an idle processor core 11 into a low power/sleep state responsive to determining that the core is idle and its predicted idle duration is long enough to justify the costs.

As noted above, prediction unit 21 may also predict active state times. Power management unit 20 and/or an affected processor core 11 may use predicted active state times to optimize performance and power consumption. For example, if prediction unit 21 predicts that a given processor core 11 will be active for only a short time, power management unit 20 may cause only a portion of the caches within that core to be enabled, as it is less likely that the full cache will be needed for that instance of the active state. For longer predicted active state durations, a larger portion of the cache may be enabled.

In addition to maintaining historical data for previous idle (and in some cases, active) state duration, prediction unit 21 may also maintain a history of prediction accuracy. This may be used to generate confidence metrics regarding future predictions, and may also provide feedback to adjust future predictions accordingly.

Prediction unit 21 in the embodiment shown may also generate an indication of a designated time in which to cause a preemptive exit from a low power/sleep state after entry thereto. The designated time may be based on the predicted duration of the next idle phase. Preemptively exiting a low power/sleep state may be defined herein as exiting the low power/sleep state in the absence of another event that would normally cause that state to be exited. Such events include (but are not limited to) interrupts and requests for access to the functional unit (e.g., the processor core 11) that is in the low power/sleep state. By causing a preemptive exit of a processor core 11 from the low power state in the illustrated embodiment, the core may be prepared to begin performing useful work at the moment it is requested. Thus, at least some of the performance loss that would otherwise be incurred in waiting for the occurrence of an interrupt or a request for access to the processor core 11 may be avoided.

In various embodiments, the number of processing nodes 11 may be as few as one, or may be as many as feasible for implementation on an IC die. In multi-core embodiments, processing nodes 11 may be identical to each other (i.e.

homogenous multi-core), or one or more processing nodes 11 may be different from others (i.e. heterogeneous multi-core). Processing nodes 11 may each include one or more execution units, cache memories, schedulers, branch prediction circuits, and so forth. Furthermore, each of processing nodes 11 may be configured to assert requests for access to memory 6, which may function as the main memory for computer system 10. Such requests may include read requests and/or write requests, and may be initially received from a respective processing node 11 by north bridge 12. Requests for access to memory 6 may be routed through memory controller 18 in the embodiment shown.

I/O interface 13 is also coupled to north bridge 12 in the embodiment shown. I/O interface 13 may function as a south bridge device in computer system 10. A number of different types of peripheral buses may be coupled to I/O interface 13. In this particular example, the bus types include a peripheral component interconnect (PCI) bus, a PCI-Extended (PCI-X), a PCIE (PCI Express) bus, a gigabit Ethernet (GBE) bus, and a universal serial bus (USB). However, these bus types are exemplary, and many other bus types may also be coupled to I/O interface 13. Peripheral devices may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to I/O unit 13 via a corresponding peripheral bus may assert memory access requests using direct memory access (DMA). These requests (which may include read and write requests) may be conveyed to north bridge 12 via I/O interface 13, and may be routed to memory controller 18.

In the embodiment shown, IC 2 includes a display/video engine 14 that is coupled to display 3 of computer system 10. Display 3 may be a flat-panel LCD (liquid crystal display), plasma display, a CRT (cathode ray tube), or any other suitable display type. Display/video engine 14 may perform various video processing functions and provide the processed information to display 3 for output as visual information. Some video processing functions, such as 3-D processing, processing for video games, and more complex types of graphics processing may be performed by graphics engine 15, with the processed information being relayed to display/video engine 14 via north bridge 12.

Various ones of the functional units in the embodiment shown may generate interrupts that can cause a given one of processor cores 11 to be woken from a sleep state (or more generally, from a low power state). For example, a peripheral device coupled to the USB port of I/O interface 13 may generate an interrupt if it needs information processed by one of processor cores 11. If a given one of the processor cores 11 is in a sleep state while the other processor cores 11 are busy with other workloads, power management unit 20 may cause the given one of processor cores 11 to be awakened. However, in the absence of such an external interrupt, the processor core 11 in the sleep state may remain in that state until being preemptively awakened at a time based on a prediction generated by prediction unit 21.

In this particular example, computer system 10 implements a non-unified memory architecture (NUMA) implementation, wherein video memory and RAM are separate from each other. In the embodiment shown, computer system 10 includes a display memory 300 coupled to display/video engine 14. Thus, instead of receiving video data from memory 6, video data may be accessed by display/video engine 14 from display memory 300. This may in turn allow for greater memory access bandwidth for each of cores 11 and any peripheral devices coupled to I/O interface 13 via one of the peripheral buses.

In the embodiment shown, IC 2 includes a phase-locked loop (PLL) unit 4 coupled to receive a system clock signal. PLL unit 4 may include a number of PLLs configured to generate and distribute corresponding clock signals to each of processing nodes 11. In this embodiment, the clock signals received by each of processing nodes 11 are independent of one another. Furthermore, PLL unit 4 in this embodiment is configured to individually control and alter the frequency of each of the clock signals provided to respective ones of processing nodes 11 independently of one another. As will be discussed in further detail below, the frequency of the clock signal received by any given one of processing nodes 11 may be increased or decreased in accordance with performance demands imposed thereupon. The various frequencies at which clock signals may be output from PLL unit 4 may correspond to different operating points for each of processing nodes 11. Accordingly, a change of operating point for a particular one of processing nodes 11 may be put into effect by changing the frequency of its respectively received clock signal.

In the case where changing the respective operating points of one or more processing nodes 11 includes the changing of one or more respective clock frequencies, power management unit 20 may change the state of digital signals SetF[M:0] provided to PLL unit 4. Responsive to the change in these signals, PLL unit 4 may change the clock frequency of the affected processing node(s). Additionally, power management unit 20 may also cause PLL unit 4 to inhibit a respective clock signal from being provided to a corresponding one of processing nodes 11.

In the embodiment shown, IC 2 also includes voltage regulator 5. In other embodiments, voltage regulator 5 may be implemented separately from IC 2. Voltage regulator 5 may provide a supply voltage to each of processing nodes 11. In some embodiments, voltage regulator 5 may provide a supply voltage that is variable according to a particular operating point (e.g., increased for greater performance, decreased for greater power savings). In some embodiments, each of processing nodes 11 may share a voltage plane. Thus, each processing node 11 in such an embodiment operates at the same voltage as the other ones of processing nodes 11. In another embodiment, voltage planes are not shared, and thus the supply voltage received by each processing node 11 may be set and adjusted independently of the respective supply voltages received by other ones of processing nodes 11. Thus, operating point adjustments that include adjustments of a supply voltage may be selectively applied to each processing node 11 independently of the others in embodiments having non-shared voltage planes. In the case where changing the operating point includes changing an operating voltage for one or more processing nodes 11, power management unit 20 may change the state of digital signals SetV[M:0] provided to voltage regulator 5. Responsive to the change in the signals SetV[M:0], voltage regulator 5 may adjust the supply voltage provided to the affected ones of processing nodes 11. In instances in power is to be removed from (i.e., gated) from one of processing nodes 11, power management unit 20 may set the state of corresponding ones of the SetV[M:0] signals to cause voltage regulator 5 to provide no power to the affected processing node 11.

It is noted that embodiments are possible and contemplated wherein the various units discussed above are implemented on separate IC's. For example, one embodiment is contemplated wherein cores 11 are implemented on a first IC, north bridge 12 and memory controller 18 are on another IC, while the remaining functional units are on yet another IC. In general, the functional units discussed above may be implemented on as many or as few different ICs as desired, as well as on a single IC. It is further noted that while the discussion above has focused on a particular embodiment of an SoC, the various methodologies described herein may be used with any IC that implements power management functions.

Figure 2:
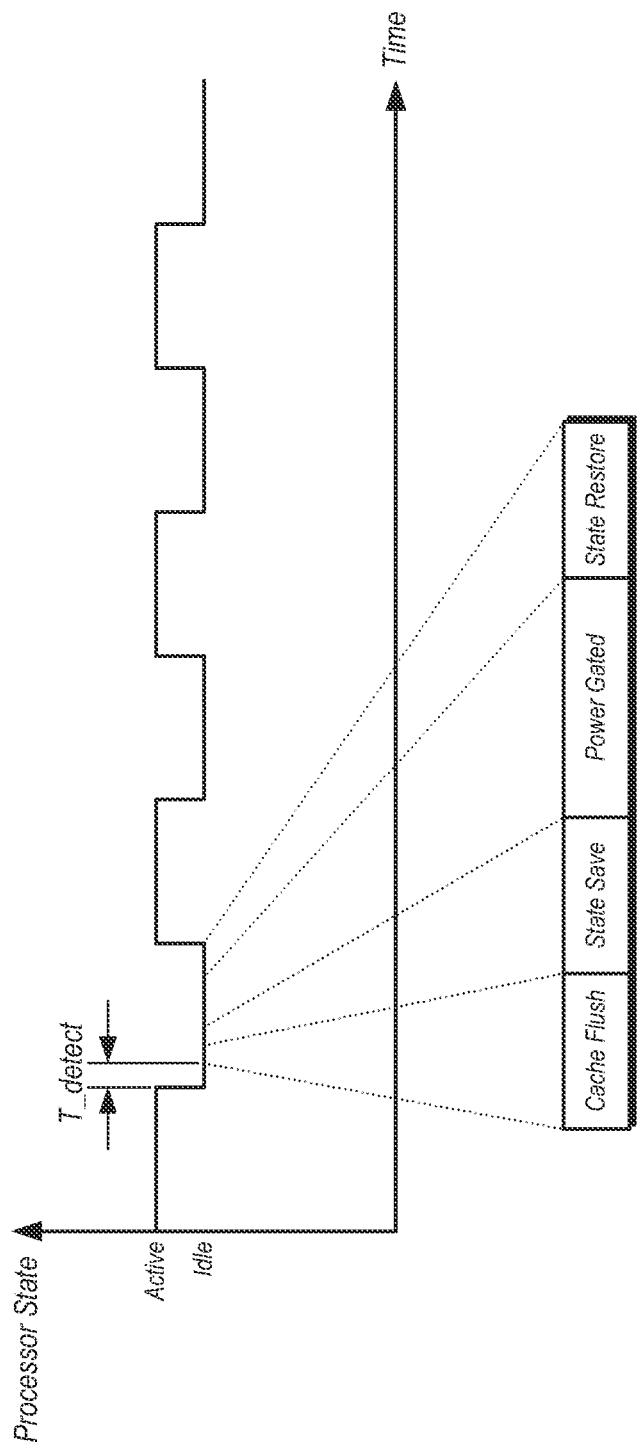
FIG. 2 is a diagram illustrating the operation of a functional unit in one embodiment of an IC.

FIG. 2 is a diagram illustrating the operation of a processor core in the embodiment of IC 2 shown above. As shown in FIG. 2, operation of a processor core 11 may cycle between intervals of an active state and intervals of an idle state. During operation in the active state, the processor core is processing instructions and doing other useful work. When in the idle state, the processor core 11 is not processing instructions or performing any useful work. If the time in the idle state is sufficient, it may be beneficial to place the processor core 11 in a low power state, or even in a sleep state. In the sleep state, the processor core may be power gated, i.e., power may be removed therefrom. Typically, the processor core 11 is also clock gated in the sleep state.

A sequence of events involving entry to and exit from the sleep state are shown in FIG. 2. Before any action is performed to place the processor core 11 in the sleep state, the processor core 11 is first determined to be idle. In the example shown, the determination that the processor core 11 is idle may be made by detecting that no useful work or other activity has been performed by processor core 11 for a time T_detect. Once this threshold has been crossed, power management unit 20 may determine that the processor core 11 is to be placed in the sleep state.

Prior to removing power from a processor core 11, any caches implemented therein are flushed. Flushing a cache comprises writing back to main memory and/or a lower level cache any modified data residing therein. Cache flushing is thus performed to maintain coherency of memory contents. In some cases, saving of the state of processor core 11 ('state save') may also be performed. Saving the state of the processor core 11 may include saving the state of various registers, data stored in various retention flops, and so forth. This information may be saved into another memory external to processor core 11. Once the cache flush and state save operations are complete, power may be removed from processor core 11 to place it into the sleep state ('power gated'). After restoring power to the processor core 11 upon exit from the sleep state, the saved state may be restored. Upon restoration of the saved state, processor core 11 may resume operation in the active state.

Exit from the sleep state may be initiated either preemptively or in response to an external event. As described above, an external event may include interrupts or requests for service by other agents of the system. Such external events may occur asynchronously and at any time when processor core 11 is in the sleep state. However, if no such event occurs during that time, power management unit 20 may nevertheless cause the processor core 11 to exit the sleep state preemptively, based on a predicted idle state duration. This may allow the state restore and any other desired operations to occur prior to processor core 11 re-entering the active state. After restoring the state and performing other operations, the processor core 11 may in some cases remain in the idle state until the occurrence of an external event such as those described above. However, if the state has been fully restored subsequent to the preemptive exit of the sleep state, processor core 11 may begin processing instructions with a minimal delay after the external event.

Figure 3:
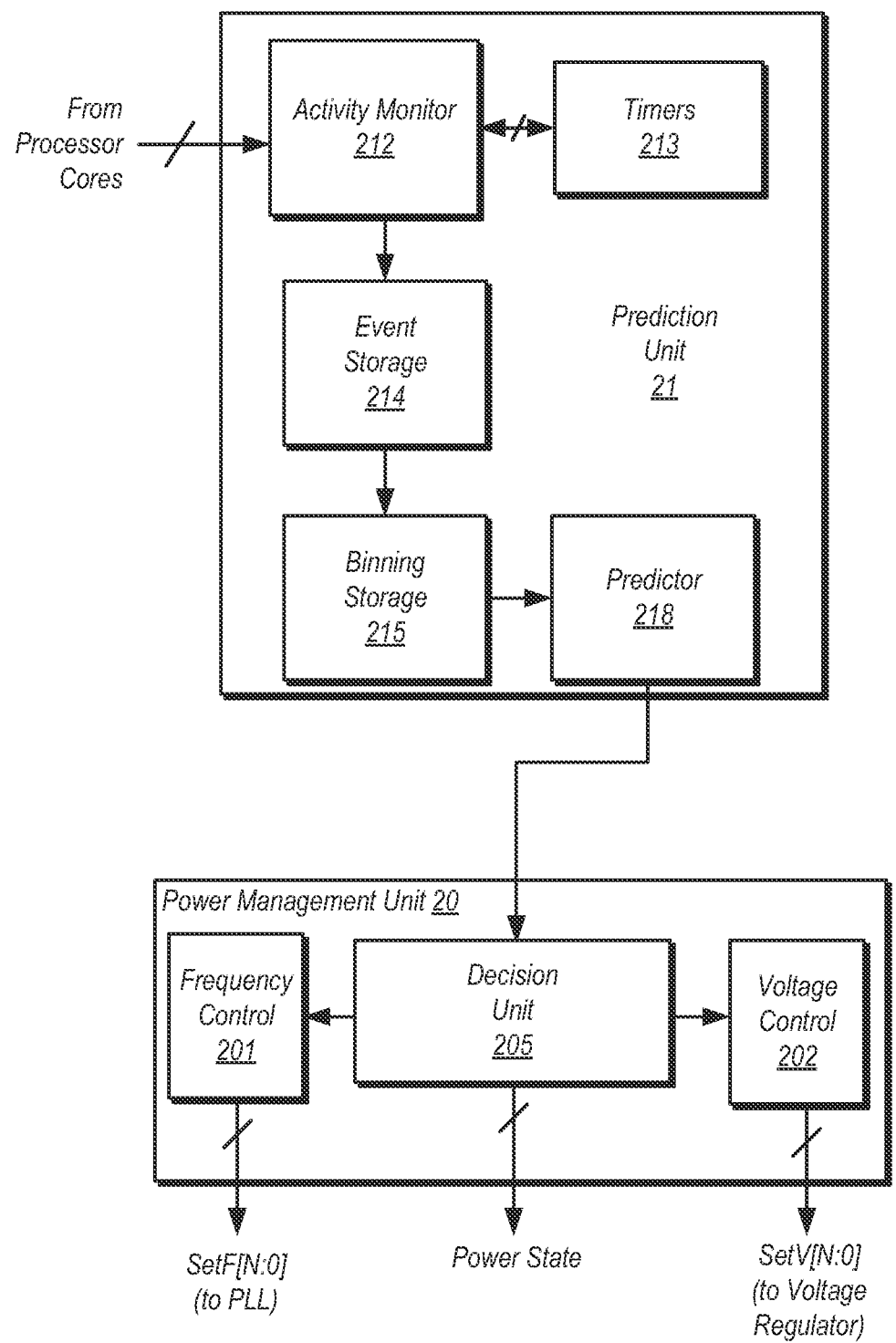
FIG. 3 is a block diagram illustrating one embodiment of a power management unit and one embodiment of a prediction unit coupled thereto.

Prediction Unit and Power Management Unit:

Turning now to FIG. 3, a block diagram illustrating one embodiment of a prediction unit 21 and an embodiment of a power management unit 20 is shown. In the embodiment shown, prediction unit 21 includes an activity monitor 212 coupled to receive indications of activity from the various processor cores 11. In a more generalized embodiment, activity monitor 212 may be coupled to receive activity indications from various different types of functional units implemented on an IC. Returning to this particular embodiment, the types of activity monitored by activity monitor 212 may include (but are not limited to) instructions executed, instructions retired, memory requests, and so on. In addition, one or more types of activity may be monitored by activity monitor 212.

Prediction unit 21 in the embodiment shown includes a plurality of timers 213 (shown here as a single block encompassing each of the timers). One timer 213 may be included for each of the functional blocks for which activity is to be monitored. Each of the timers 213 may be reset when activity is detected from its corresponding processor core by activity monitor 212. After being reset, a given timer 213 may begin tracking the time since the most recent activity. Each timer 213 may report the time since activity was most recently detected in its corresponding processor core 11. After the time since the most recent activity has reached a certain threshold for a given processor core 11, activity monitor 212 may indicate that the given core is idle. Activity monitor 212 may further continue to record the time that the processor core 11 is idle, based on the time value received from the corresponding timer 213, until the core resumes activity.

It is noted that, as an alternative to implementing activity monitor 212, entry into an idle state may be determined responsive to a halt instruction from the operating system. In generally, any suitable mechanism can be used to determine if a processor core 11 (or more generally, a functional unit) is idle, and such mechanisms may be implemented using hardware, software, or any combination thereof.

Once a processor core 11 has resumed activity after being determined to have been in the idle state, activity monitor 212 may record the duration of the idle state in that core in event storage 214. In the embodiment shown, event storage 214 may store the duration for each the most recent N instances of the idle state for each of the processor cores 11 for which idle state times are being monitored. In one embodiment, event storage 214 may include a plurality of first-in, first-out (FIFO) memories, one for each processor core 11. Each FIFO in event storage 214 may store the duration of the most recent N instances of the idle state for its corresponding processor core 11. As the durations of new instances of idle states are recorded in a FIFO corresponding to a given core, the durations for the oldest idle state instances may be overwritten.

Binning storage 215 is coupled to event storage 214, and may, for each processor core 11, store counts of idle state durations in corresponding bins in order to generate a distribution of idle state durations. Binning storage 215 may include logic to read the recorded durations from event storage 214 and may generate the count values for each bin. As old duration data is overwritten by new duration with the occurrence of additional instances of the idle state, the logic in binning storage 215 may update the count values in the bins. The binning methodology is further illustrated below in reference to FIG. 4.

Predictor 218 is coupled to binning storage 215. Based on the distribution of idle state durations for a given processor core 11, predictor 218 may generate a prediction as to the duration of the next idle state. Various methodologies may be used to generate the prediction, and these methodologies are discussed in further detail below.

In addition to predictions for the duration of the idle state, predictor 218 may also generate indications for predetermined times at which low power states may be exited based on the idle state duration predictions. For example, in one embodiment, if a processor core 11 is placed in a sleep state (i.e. power and clock both removed therefrom) during an instance of the idle state, power management unit 20 may cause that core to exit the sleep state at a predetermined time based on the predicted idle state duration. This exit from the sleep state may be invoked without any other external event (e.g., an interrupt from a peripheral device) that would otherwise cause an exit from the sleep state. Moreover, the exit from the sleep state may be invoked before the predicted duration of the idle state has fully elapsed. If the prediction of idle state duration is reasonably accurate, the preemptive exit from the sleep state may provide various performance advantages. For example, the restoring of a previously stored state may be performed between the time of the exit from the sleep state and the resumption of the active state, thus enabling the processor core 11 to begin executing instructions faster than it might otherwise be able to do so in the case of a reactive exit from the sleep state. Additional details regarding the preemptive exit from a sleep state (or more generally, from a low power state) are provided below.

Predictions made by predictor 218 may be forwarded to decision unit 205 of power management unit 20. In the embodiment shown, decision unit 205 may use the prediction of idle state time, along with other information, to determine whether to place an idle processor core 11 in a low power state. Additionally, decision unit 205 may determine what type of low power state the idle processor core is to be placed. For example, if the predicted idle duration is relatively short, decision unit 205 may reduce power consumption by reducing the frequency of a clock signal provided to the processor core 11, reducing the voltage supplied to the processor core 11, or both. In another example, if the predicted idle duration is long enough such that it exceeds a break-even point, decision unit 205 may cause the idle processor core 11 to be placed in a sleep state in which neither power nor an active clock signal are provided to the core. Responsive to determining which power state a processor core 11 is to be placed, decision unit 205 may provide power state information ('Power State') to that core. A processor core 11 receiving updated power state information from decision unit 205 may perform various actions associated with entering the updated power state (e.g., a state save in the event that the updated power state information indicates that the processor core 11 will be entering the sleep state).

Power management unit 20 in the embodiment shown includes a frequency control unit 201 and a voltage control unit 202. Frequency control unit 201 is configured to generate control signals for adjusting the frequency of the clock signals provided to each of the processor cores 11. The frequency of a clock signal provided to a given one of processor cores 11 may be adjusted independently of the clock signals provided to the other cores. The frequency control signals may be provided to PLL unit 4. In addition to changing the frequency of a clock signal, frequency control signals may also cause PLL unit 4 to inhibit a clock signal ('clock gate') from being provided to a selected one of processor cores 11. Voltage control unit 202 in the embodiment shown is configured to generate control signals provided to voltage regulator 5 for independently adjusting the respective supply voltages received by each of the processor cores 11. Voltage control signals may be used to reduce a supply voltage provided to a given processor core 11, increase a supply voltage provided to that core, or to turn off that core by inhibiting it from receiving any supply voltage. Both frequency control unit 201 and voltage control unit 202 may generate their respective control signals based on information provided to them by decision unit 205.

Figure 4:
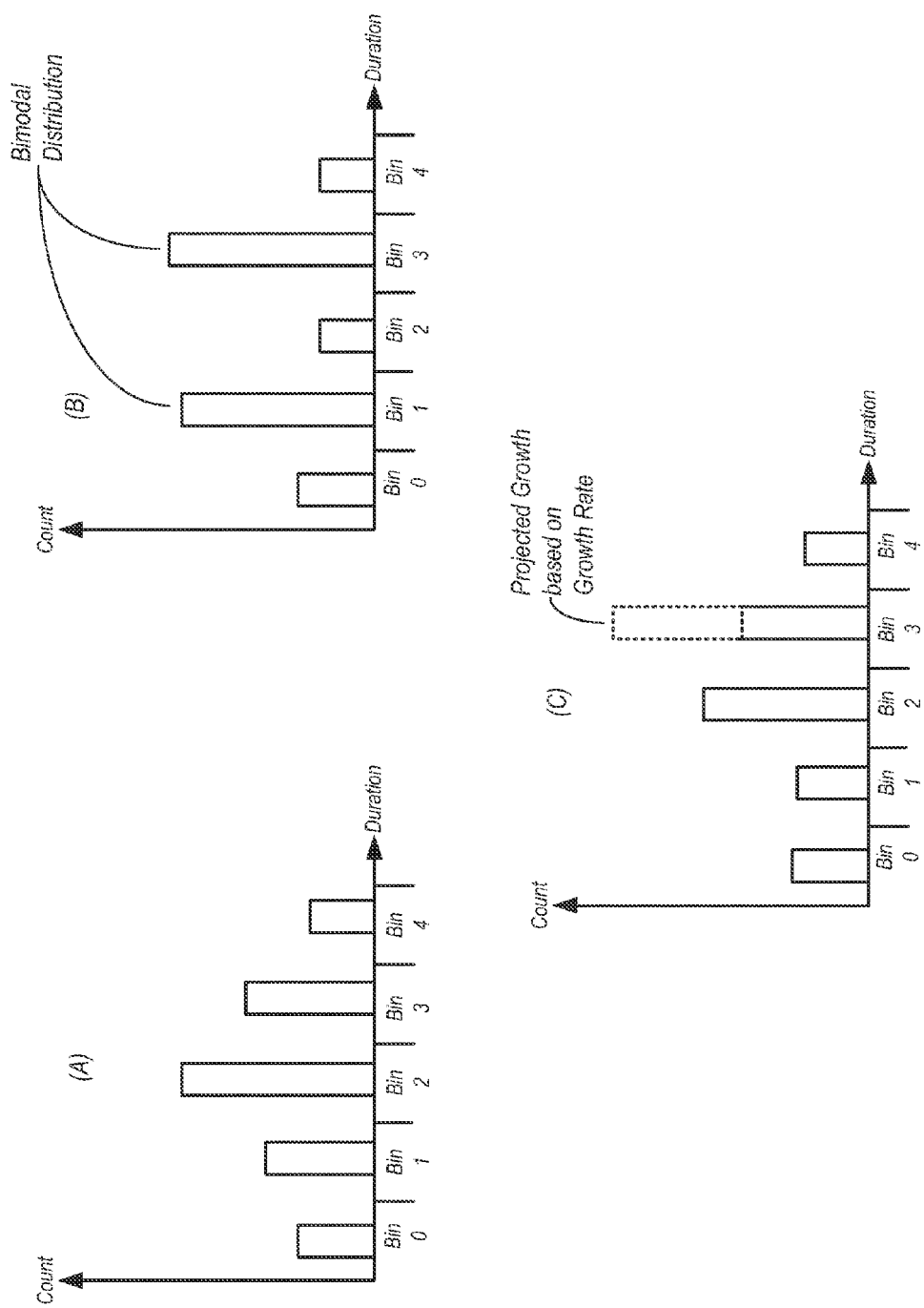
FIG. 4 includes a number of histograms to illustrate binning approaches used by various embodiments of a prediction unit.

Binning of Duration Data:

FIG. 4 includes a number of histograms to illustrate binning approaches used by various embodiments of a prediction unit. Various embodiments of the hardware discussed above may utilize any of the binning approaches discussed below. Furthermore, some embodiments may switch binning approaches based on various factors such as user inputs and operating conditions. It is further noted that the alternatives to the various embodiments discussed above may be implemented partly or wholly in software, and may thus fall within the scope of this disclosure.

The horizontal axis for each of the illustrated examples is divided into bins that cover a specified duration. The spacing of the bins may be linear or logarithmic in various embodiments. In some embodiments, the spacing of the bins may be dynamically adjustable based on factors such as previous history or break-even points for entering low power states. The vertical axis in each of the illustrated examples represents a count of incidents of idle durations. Thus, the data in each bin represents a count of the number of incidents of idle durations falling within the range represented by that particular bin.

In example (A) of FIG. 4, the distribution of idle state duration history shows that the range represented by Bin 2 has the greatest number of incidents, with Bin 3 having the next greatest number. A prediction unit as described above could use the data shown in (A) to predict that the duration of the next idle state will fall within to the range represented by Bin 2. Alternatively, a prediction unit could compute an average idle state duration based on the data shown in (A) and use that average as a basis to predict the duration of the next idle state. In some cases, when averaging is performed, bins having counts below a certain threshold may be ignored. For example, in (A), if the count values in Bin 0 and Bin 4 are below a threshold, they may be ignored, and the average may be computed based on the data present in Bins 1, 2, and 3.

In (B), the distribution of idle state times if bimodal. That is, Bins 1 and 3 each show significantly greater counts than Bins 0, 2, and 4. In cases of a bimodal distribution, a prediction unit may predict the next idle state duration to fall into the range corresponding to the bin representing the greater duration, which is Bin 3 in this case. Using the example shown here, if upon entry into the next idle state, the duration thereof extends beyond the range represented by Bin 1, it is likely that the final duration will fall within the range represented by Bin 3, based on the historical distribution. In general, when a bimodal distribution occurs, one embodiment of a prediction unit may base its prediction of the next idle state duration on the bin representing the greater range of durations. Other embodiments of a prediction unit may incorporate additional factors in determining which of the two bins in a bimodal distribution should be the basis for predicting the duration of the next idle state.

In (C), Bin 2 has the highest count of idle state durations, while Bin 3 has the fastest growing count of idle state durations (as represented by the dashed lines marked 'Projected Growth based on Growth Rate'). In one embodiment, a prediction unit may use both the event storage and the binning storage to determine the growth rate for each bin. In such an embodiment, a prediction may base a prediction on the bin having the fastest growth rate, which can in some instances be different from the bin having the greatest count value. In the example illustrated in (C), a prediction unit may predict that the duration of the next idle state is within the range specified by Bin 3, which has the fastest growth rate, rather than Bin 2, which indicates an overall greater number of incidents. Predicting the duration of the next idle state in this manner may thus give extra weight to more recent history and thus provide quicker adaptation to changing operating conditions. In embodiments enabled to determine the bin having the fastest growing count value, the prediction unit may implement the ability to track the rates of growth (and decline) for the counts in each of the bins.

Methodologies for Preemptive Exit Based on Predicted Idle State Duration:

FIGS. 5-8 illustrate various methodologies in which an preemptive exit of a low power state is performed based on a predicted idle state duration. Each of the methodologies discussed herein may utilize any of the various hardware embodiments discussed above. The various methodologies discussed herein may also be implemented using various combinations of hardware and software or may be fully software implemented. Furthermore, the methodologies discussed herein may be implemented using hardware, software, and combination hardware/software embodiments that are otherwise not discussed herein.

Figure 5:
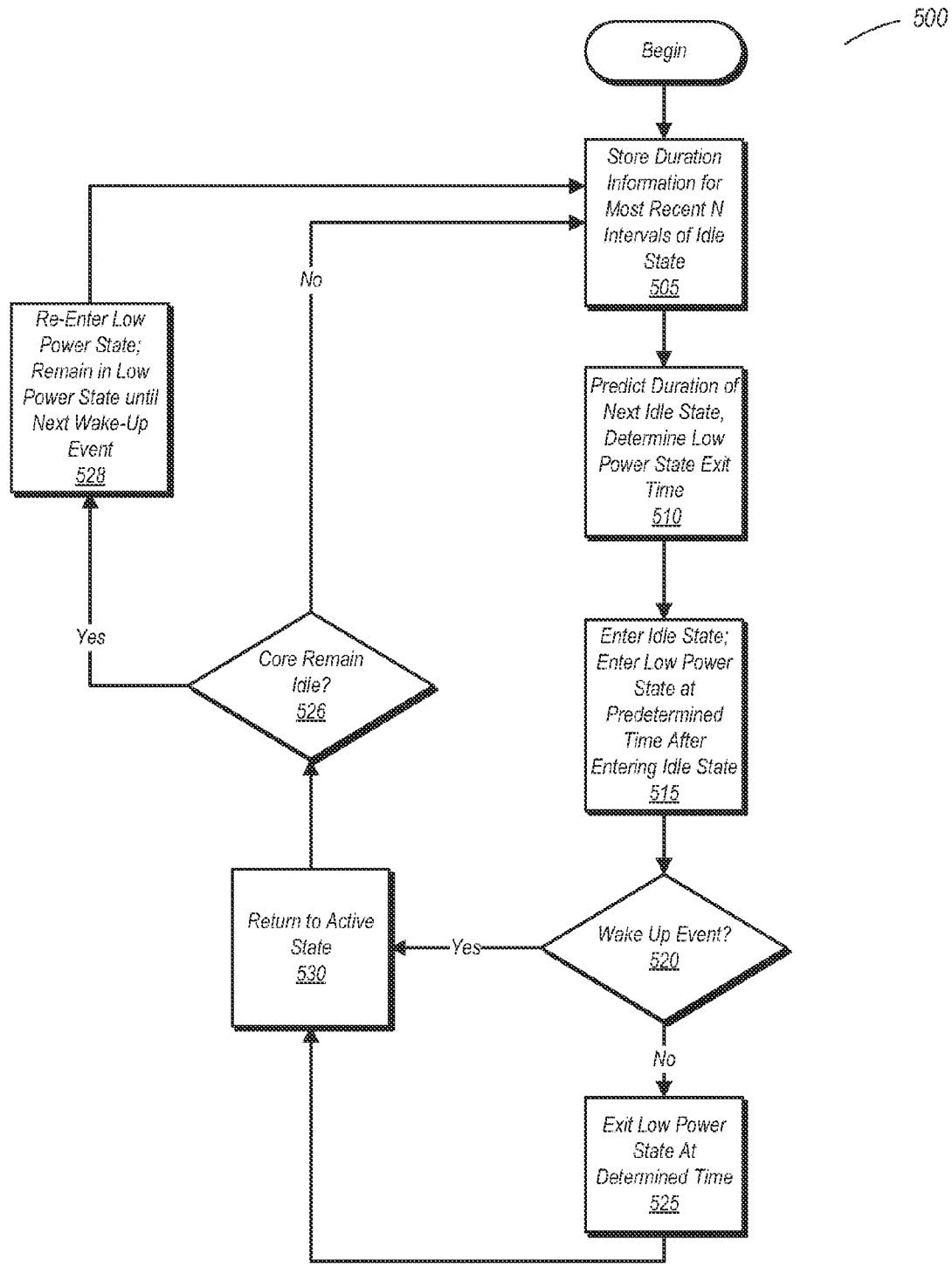
FIG. 5 is a flow diagram illustrating one embodiment of a method for using an idle state prediction to preemptively exit a low power state.

FIG. 5 is a flow diagram illustrating one embodiment of a method for using an idle state prediction to preemptively exit a low power state. In the embodiment shown, method 500 begins with the storage of duration information for a most recent N intervals of an idle state (block 505). Based on this data, a prediction unit may predict the duration of the next idle state, and may also determine a time indicating when a low power state should be exited (block 510). At some point subsequent to the prediction, the functional unit (e.g., a processor core) that is the subject thereof may enter the idle state, and thereafter a power management unit may place the functional unit in a low power state (block 515). If a wakeup event occurs (block 520, yes), then the power management unit may cause the functional unit to exit the low power state (block 530). If no wakeup event occurs (block 520, no), then the functional unit may preemptively exit the low power state at the determined time (block 525). A wakeup event may be defined as an event such as an interrupt or a request for service that would cause the functional unit to exit the low power state if it was otherwise enabled to remain there indefinitely. Thus, in method 500, in the absence of a wakeup event prior to the determined time, the power management unit may cause the functional unit to preemptively exit the low power state and to begin preparation to perform useful work. Such preparation may include the restoration of a particular state, warming up of a PLL or other clock circuitry, and so on. The preemptive exit of the low power state may occur prior to the predicted exit time from the idle state. At some point subsequent to the preemptive exit of the low power state, the functional unit itself may exit the idle state and return to the active state (block 530), thereby resuming the performance of its intended function.

In some cases, if the return to the active state in block 530 is the result of a preemptive exit performed in block 525, it may be determined that the exit from the low power state was performed too early. More particularly, a core may be returned to the active state responsive to preemptive exit per block 525, but may nonetheless remain idle (e.g., as indicated by a halt instruction from the operation system). Thus, after returning to the active state (block 525) a check may be performed to determine if the core is otherwise still idle (block 526). If the core is not idle (and thus begins performing useful work shortly after reentering the active state; block 526, no), the method may return to block 505. However, if the core remains idle even after returning to the active state (block 526, yes), then the core may be placed back into a low power state and may remain in that state until a wake-up event occurs (block 528). Re-entry into the low power state in these circumstances may be faster than under normal circumstances. For example, since it is unlikely that any loads to the cache were performed, cache flushes need not be performed. Furthermore, if the architectural state of the core is saved elsewhere, no core state save is performed before re-entering the low power state.

Figure 6:
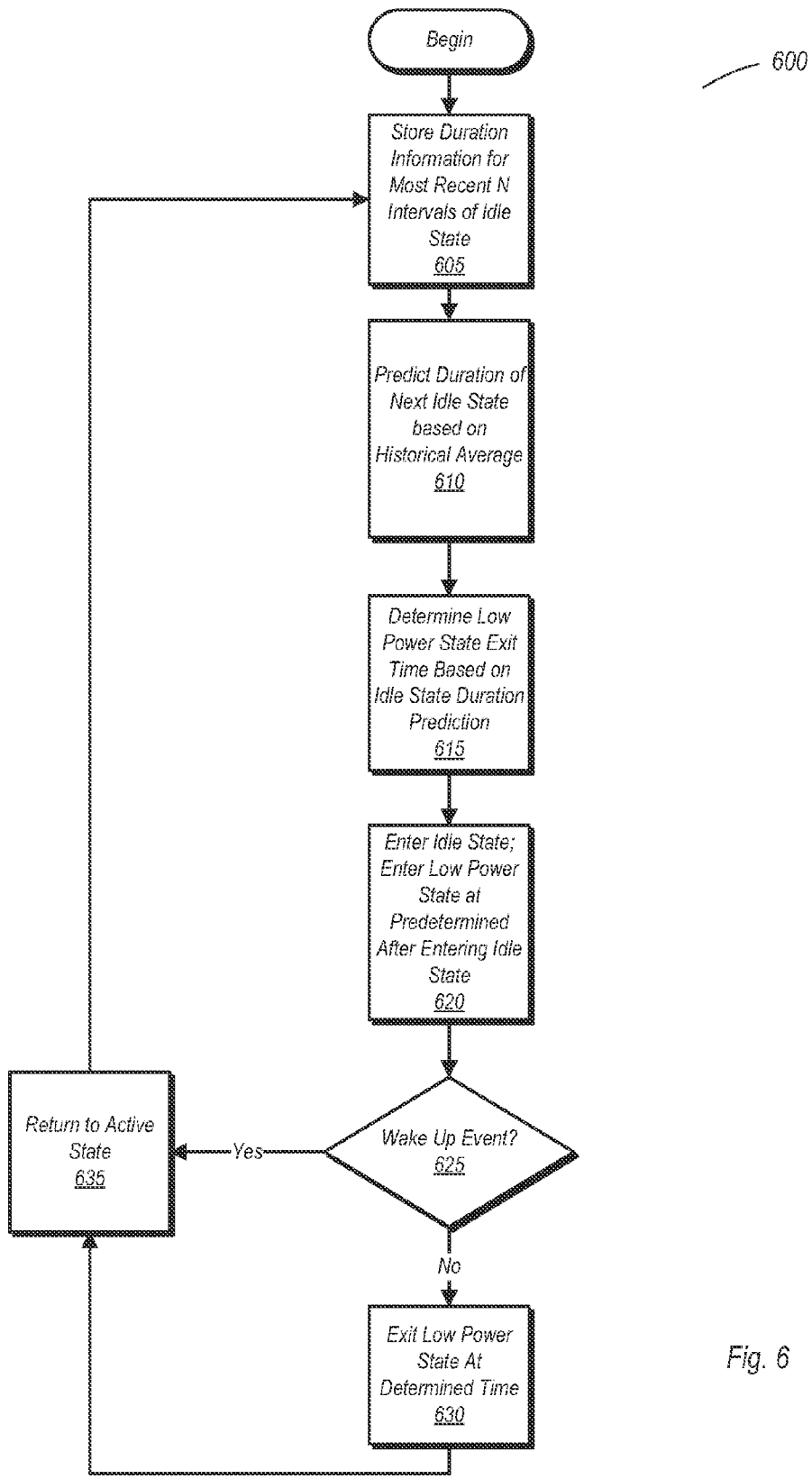
FIG. 6 is a flow diagram illustrating one embodiment of a method for transitioning a functional block of an IC into and out of a low power state based on an average duration prediction.

FIG. 6 is a flow diagram illustrating one embodiment of a method for transitioning a functional block of an IC into and out of a low power state based on an average duration prediction. Method 600 begins with the storage of duration information for the most recent N intervals of the idle state (block 605). Based on the stored duration information, a prediction unit may make a prediction of the duration of the next idle state based on an historical average (block 610). Based on the predicted duration of the idle state, the prediction unit may determine a time at which a low power state is to be preemptively exited in the absence of a wakeup event (block 615). At some point subsequent to making the prediction and determining the exit time, the functional unit that is the subject thereof may become idle and subsequently enter the low power state (block 620). If a wakeup event occurs (block 625, yes), the functional unit may exit both the idle state and the low power state (block 635). In the absence of a wakeup event (block 625, no), the power management unit may cause the functional unit to exit the low power state at the determined time (block 630). Subsequently, the functional unit may exit the idle state and resume operation in the active state (block 635), and the method may then return to block 605.

Figure 7:
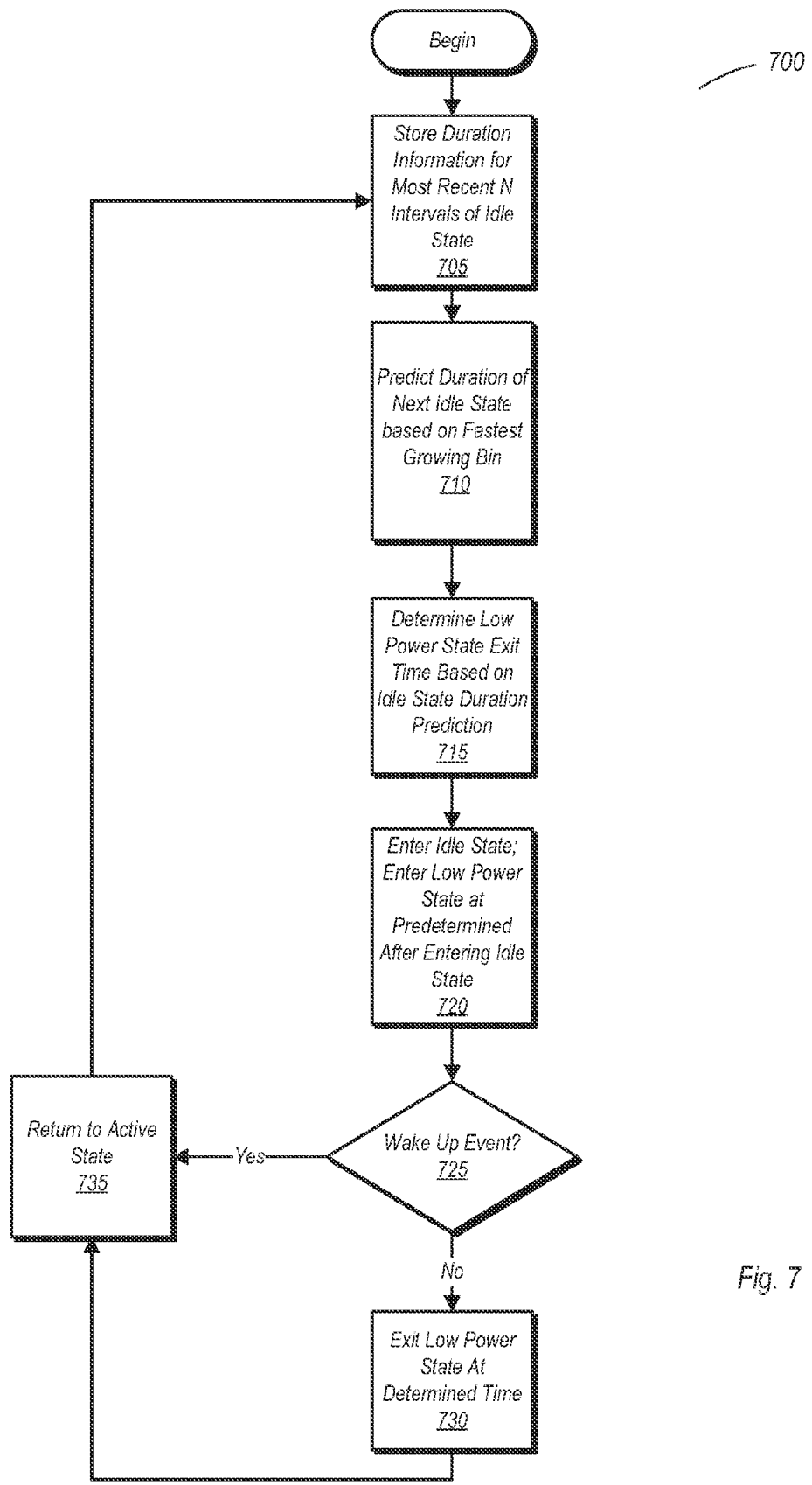
FIG. 7 is a flow diagram illustrating one embodiment of a method for transitioning a functional block of an IC into and out of a low power state based on a fastest-growing bin prediction.

FIG. 7 is a flow diagram illustrating one embodiment of a method for transitioning a functional block of an IC into and out of a low power state based on a fastest-growing bin prediction. Method 700 begins with the storing of the duration information for the most recent N instances of the idle state (block 705). The data may be arranged into bins as discussed above, and growth rates of each of the bins may also be tracked. A prediction unit may then predict the duration of the next interval of the idle state based on the fastest growing bin (block 710). Based on the predicted duration of the next idle state, the prediction unit may also determine a time at which a preemptive exit from a low power state is to be performed (block 715). Subsequently, the functional unit for which the prediction was performed may become idle and may thus be placed in a low power state (block 720). If a wakeup event occurs prior to the determined time (block 725, yes), then the power management unit may cause the functional unit to exit the low power state and it may subsequently resume operation in the active state (block 735). If no wakeup event occurs (block 725, no), then the power management unit may cause a preemptive exit from the low power state at the determined time (block 730). At some point thereafter, the functional unit may resume operating in the active state.

Figure 8:
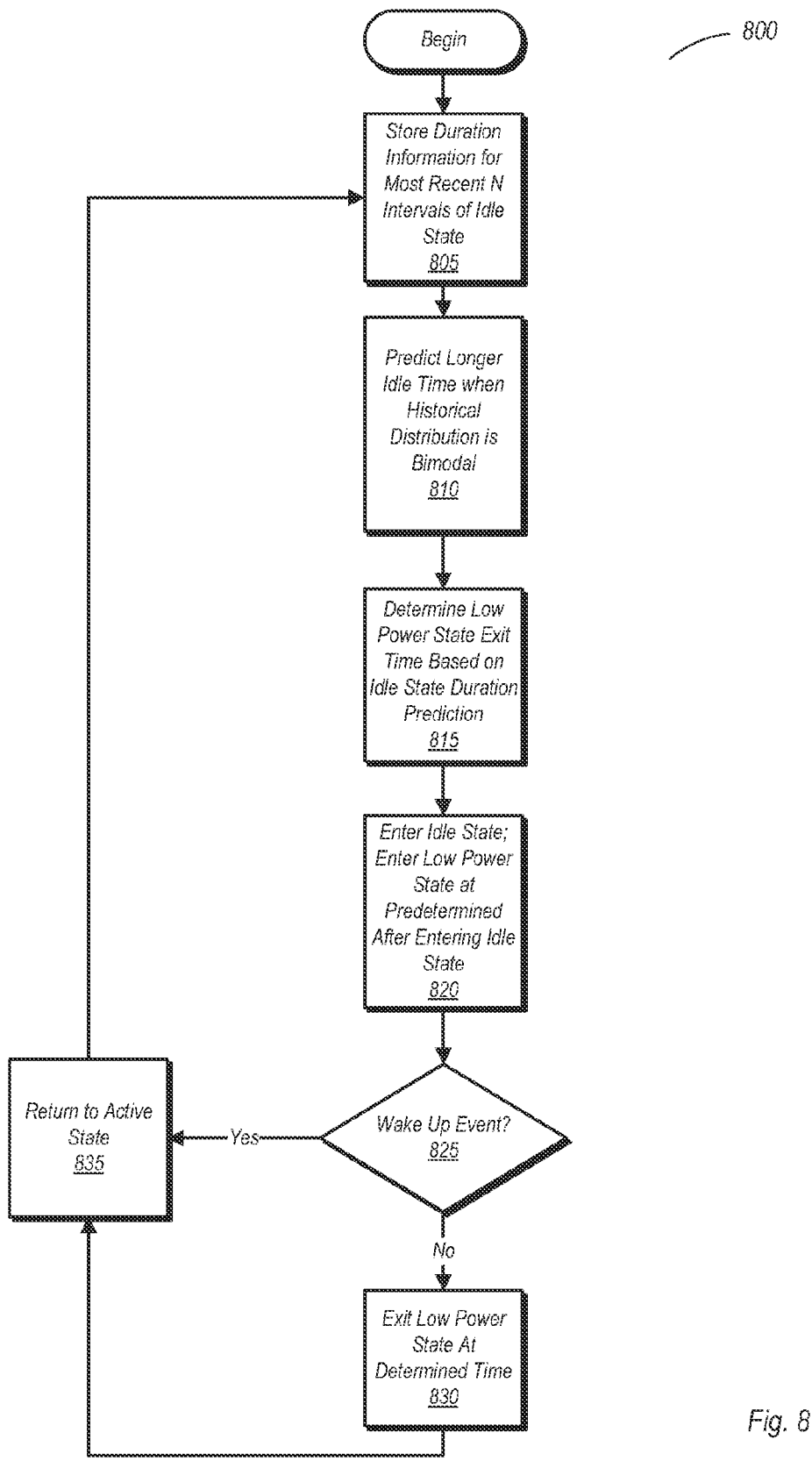
FIG. 8 is a flow diagram illustrating one embodiment of a method for transitioning a functional block of an IC into and out of a low power state based on a prediction resulting from a bimodal distribution of idle state times.

FIG. 8 is a flow diagram illustrating one embodiment of a method for transitioning a functional block of an IC into and out of a low power state based on a prediction resulting from a bimodal distribution of idle state times. Method 800 begins with the storing of duration for the most recent N intervals of the idle state (block 805), with count information being arranged into bins as discussed above. Method 800 assumes that the arrangement of data into bins results in a bimodal distribution. Based on the bimodal distribution of idle state durations, a prediction unit may predict that the duration of the next idle state time will correspond to the longer of the two durations that make up the bimodal distribution (block 810).

Based on the prediction, the prediction unit may also determine a time to preemptively exit a low power state in the absence of a wakeup event (block 815). Subsequently, the functional unit for which the prediction was made may become idle, and a power management unit may respond by placing it in a low power state (block 820). If a wakeup event occurs prior to the determined preemptive exit time (block 825, yes), then the low power state is exited and operation in the active state is resumed thereafter. Otherwise, if no wakeup event occurs (block 825, no), then the power management unit may cause the functional unit to preemptively exit the low power state at the determined time (block 830). At some point thereafter, the functional unit may resume operation in the active state (block 835), and the method may return to block 805.

Figure 9:
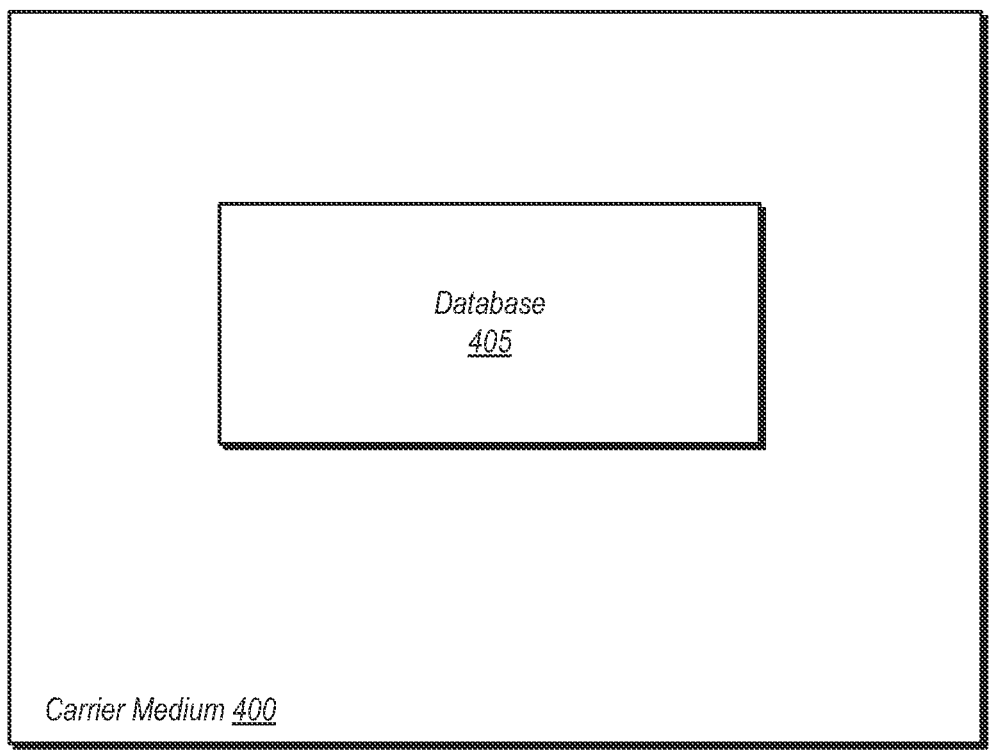
FIG. 9 is a block diagram illustrating one embodiment of a computer readable medium.

Computer Accessible Storage Medium:

Turning next to FIG. 9, a block diagram of a computer accessible storage medium 400 including a database 405 representative of the system 10 is shown. Generally speaking, a computer accessible storage medium 400 may include any non-transitory storage media accessible by a computer during use to provide instructions and/or data to the computer. For example, a computer accessible storage medium 400 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the database 405 of the system 10 carried on the computer accessible storage medium 400 may be a database or other data structure which can be read by a program and used, directly or indirectly, to fabricate the hardware comprising the system 10. For example, the database 405 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database 405 on the computer accessible storage medium 400 may be the netlist (with or without the synthesis library) or the data set, as desired. In other alternative embodiments, database 405 may include computer executable instructions/programs and other information that may be used to implement in software, partially or fully, any one or more of the methods (and variations thereof) discussed above with reference to FIGS. 5, 6, 7, and 8.

While the computer accessible storage medium 400 carries a representation of the system 10, other embodiments may carry a representation of any portion of the system 10, as desired, including IC 2, any set of agents (e.g., processing nodes 11, I/O interface 13, power management unit 20, etc.) or portions of agents (e.g., activity monitor 212, predictor 218, etc.).

Numerous variations and modifications will become apparent to those skilled in the art once the above disclosure is fully appreciated. It is intended that the following claims be interpreted to embrace all such variations and modifications.

What is claimed is:

1. A method comprising:
   entering an idle state during operation of a functional unit of an integrated circuit (IC);
   placing the functional unit in a low power state responsive to the functional unit entering the idle state; and
   preemptively exiting the low power state at a predetermined time after entering the low power state, wherein the predetermined time is based on a prediction of idle state duration made prior to entering the low power state, wherein the prediction is made by a prediction unit implemented on the IC;
   wherein the prediction unit is configured to record a history of idle state durations and subdivide the history of idle state durations into a plurality of bins of a histogram, wherein each of the plurality of bins is designated to record a count of instances of idle state durations within a specific range, and further configured to generate the prediction based on the history of idle state durations indicative of durations of previous instances in which the functional unit was in the idle state.

2. The method as recited in claim 1, wherein the history of idle state durations includes a history of a most recent N instances of the functional unit entering the idle state.

3. The method as recited in claim 2, wherein the prediction of idle state time is based on an average idle state time of the most recent N instances of the functional unit being the idle state.

4. The method as recited in claim 1, wherein the prediction of idle state time is based on a determination of which of the plurality of bins has the fastest increasing count for a most recent N intervals of the idle state.

5. The method as recited in claim 1, wherein in an event in which two the plurality of bins indicates a bimodal distribution of idle state times, the prediction of idle state time is based on which of the two bins corresponds to a greater idle state time.

6. The method as recited in claim 1, wherein preemptively exiting the low power state at the predetermined time comprises exiting the low power state prior to the predicted idle state duration elapsing.

7. The method as recited in claim 6, further comprising returning the functional unit to the low power state subsequent to preemptively exiting the low power state responsive to determining that the functional unit remains in the idle state.

8. The method as recited in claim 1, wherein the low power state is a sleep state in which power is removed from the functional unit.

9. An integrated circuit comprising:
   a functional unit configured to cycle between intervals of an active state and intervals of an idle state;
   a power management unit configured to place the functional unit in a low power state responsive to the functional unit entering the idle state, and further configured to preemptively cause the functional unit to exit the low power state at a predetermined time after entering the low power state, wherein the predetermined time is based on a prediction of idle state duration made prior to entering the low power state, and a prediction unit configured to record a history of idle state durations and subdivide the history of idle state durations into a plurality of bins of a histogram, wherein each of the plurality of bins is designated to record a count of instances of idle state durations within a specific range, and further configured to generate the prediction based on the history of idle state durations indicative of durations of previous instances in which the functional unit was in the idle state.

10. The integrated circuit as recited in claim 9, wherein the prediction unit is configured to store a history of a most recent N instances of the functional unit entering the idle state.

11. The integrated circuit as recited in claim 10, wherein the prediction unit is configured to predict the idle state duration based on an average idle state duration of the most recent N instances of the functional unit being in the idle state.

12. The integrated circuit as recited in claim 9, wherein the prediction unit is configured to predict the idle state time based on a determination of which of the plurality of bins has the fastest increasing count for a most recent N intervals of the idle state.

13. The integrated circuit as recited in claim 9, wherein the prediction unit is configured to, in an event in which two the plurality of bins indicates a bimodal distribution of idle state times, base the prediction of idle state time on which of the two bins corresponds to a greater idle state time.

14. The integrated circuit as recited in claim 9, wherein the power management unit is configured to cause the functional unit to preemptively exit the low power state prior to the predicted idle state duration elapsing.

15. The integrated circuit as recited in claim 9, wherein the power management unit is configured to place the functional unit in the low power state at a predetermined time after the functional unit has entered the idle state.

16. The integrated circuit as recited in claim 9, wherein the low power state is a sleep state in which the power management unit causes power to be removed from the functional unit.

17. A system comprising:
a plurality of processor cores implemented on a system-on-a-chip (SoC), wherein each of the plurality of processor cores is configured to cycle between intervals of an active state and an idle state;
a power management unit configured to place a selected one of the processor cores into a low power state responsive to the selected one of the processor cores entering the idle state, and further configured to preemptively cause the selected one of the processor cores to exit the low power state at a predetermined time after entering the low power state, wherein the predetermined time is based on a prediction of idle state duration made prior to entering the low power state; and
a prediction unit configured to record a history of idle state durations and subdivide the history of idle state durations into a plurality of bins of a histogram, wherein each of the plurality of bins is designated to record a count of instances of idle state durations within a specific range, and further configured to generate the prediction based on the history of idle state durations indicative of durations of previous instances in which the functional unit was in the idle state.

18. The system as recited in claim 17, wherein the prediction unit is configured to store a history of a most recent N instances that the selected one of the processor cores entered the idle state.

19. The system as recited in claim 18, wherein the prediction unit is configured to generate the prediction of idle state duration based on an average idle state duration of the most recent N instances of the selected one of the processor cores being in the idle state.

20. The system as recited in claim 17, wherein the power management unit is configured to place the selected one of the processor cores in the low power state at a predetermined time after the functional unit has entered the idle state.

21. The system as recited in claim 17, wherein the low power state is a sleep state in which the power management unit causes power to be removed from the selected one of the processor cores.

22. A non-transitory computer readable storage medium comprising a data structure which is operated upon by a program executable on a computer system, the program operating on the data structure to perform a portion of a process to fabricate an integrated circuit including circuitry described by the data structure, the circuitry described in the data structure including:
a functional unit configured to cycle between intervals of an active state and intervals of an idle state; and
a power management unit configured to place the functional unit in a low power state responsive to the functional unit entering the idle state, and further configured to preemptively cause the functional unit to exit the low power state at a predetermined time after entering the low power state, wherein the predetermined time is based on a prediction of idle state duration made prior to entering the low power state, wherein the prediction is made by a prediction unit implemented on the IC;
wherein the prediction unit is configured to record a history of idle state durations and subdivide the history of idle state durations into a plurality of bins of a histogram, wherein each of the plurality of bins is designated to record a count of instances of idle state durations within a specific range, and further configured to generate the prediction based on the history of idle state durations indicative of durations of previous instances in which the functional unit was in the idle state.

23. The computer readable storage medium as recited in claim 22, wherein the power management unit described in the data structure is configured to cause the functional unit to enter a sleep state at a predetermined time subsequent to the functional unit entering the idle state.

* * * * *